US012610891B2

(12) United States Patent

Ruwoldt

(10) Patent No.: US 12,610,891 B2

(45) Date of Patent: Apr. 28, 2026

(54) CONCAVE COVER PLATES FOR IMPROVING OPERATIONAL PERFORMANCE IN A COMBINE HARVESTER

(71) Applicant: Thunderstruck Sales & Marketing Ltd., Winkler (CA)

(72) Inventor: Robert Ruwoldt, Haven (AU)

(73) Assignee: Thunderstruck Sales & Marketing Ltd, Winkler (CA)

( * ) Notice: Subject to any disclaimer, the term of this patent is extended or adjusted under 35 U.S.C. 154(b) by 402 days.

(21) Appl. No.: 18/319,736

(22) Filed: May 18, 2023

(65) Prior Publication Data

US 2024/0373788 A1 Nov. 14, 2024

(51) Int. Cl.
*A01F 12/28* (2006.01)

(52) U.S. Cl.
CPC ..................................... *A01F 12/28* (2013.01)

(58) Field of Classification Search
CPC ................................ A01F 12/24; A01F 12/26
See application file for complete search history.

(56) References Cited

U.S. PATENT DOCUMENTS

| | | | |
|---|---|---|---|
| 8,133,100 B2 | 3/2012 | Regoer et al. | |
| 9,215,845 B2 | 12/2015 | Regier | |
| 10,779,474 B2 | 9/2020 | Ritter | |
| 11,122,743 B2 | 9/2021 | Robertson | |
| 11,877,538 B1 * | 1/2024 | Calmer | ................. A01F 12/184 |
| 2018/0103588 A1 * | 4/2018 | Ritter | ....................... A01F 12/26 |
| 2021/0105946 A1 * | 4/2021 | Robertson | ............... A01F 7/067 |
| 2023/0041302 A1 * | 2/2023 | Nohrden | ................. A01F 7/067 |

FOREIGN PATENT DOCUMENTS

| | | |
|---|---|---|
| WO | 2021222229 | 11/2021 |

OTHER PUBLICATIONS

PLP Combine Concave Selection Wheat. YouTube [online][video]. PrairieLand Partners John Deere, Jun. 3, 2015. Retrieved from <https://www.youtube.com/watch?v=w86LtRfIBJ8>.

* cited by examiner

*Primary Examiner* — Brad Harcourt
(74) *Attorney, Agent, or Firm* — Kyle R Satterthwaite; Ryan W Dupuis; Ade & Company Inc.

(57) ABSTRACT

Concave cover plates for a rotary processing system of a combine harvester have strategically placed holes therein design to concentrate grain output from the concave grates of the rotary processing system at a circumferential mid-region of the concave grates to promote even loading of a set of oscillating sieves in an underlying cleaning mechanism of the combine harvester. A set of such plates are installed in a series of progressively increasing openness in the circumferential direction of the concave grates in a rearward direction through the processing system, for more grain-on-grain threshing and more centralized output at a front intake end than at spots further rearward therefrom.

20 Claims, 10 Drawing Sheets

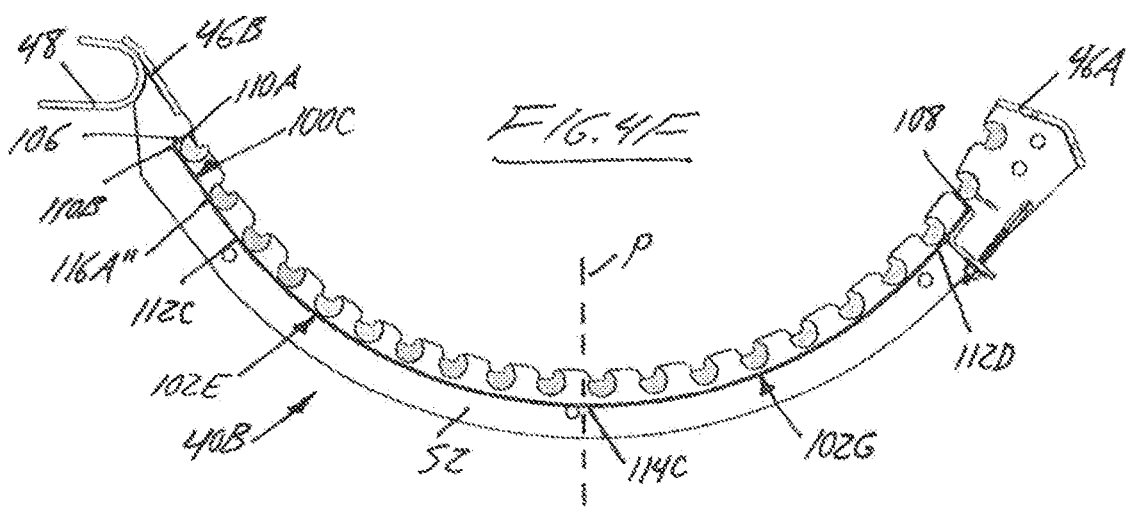

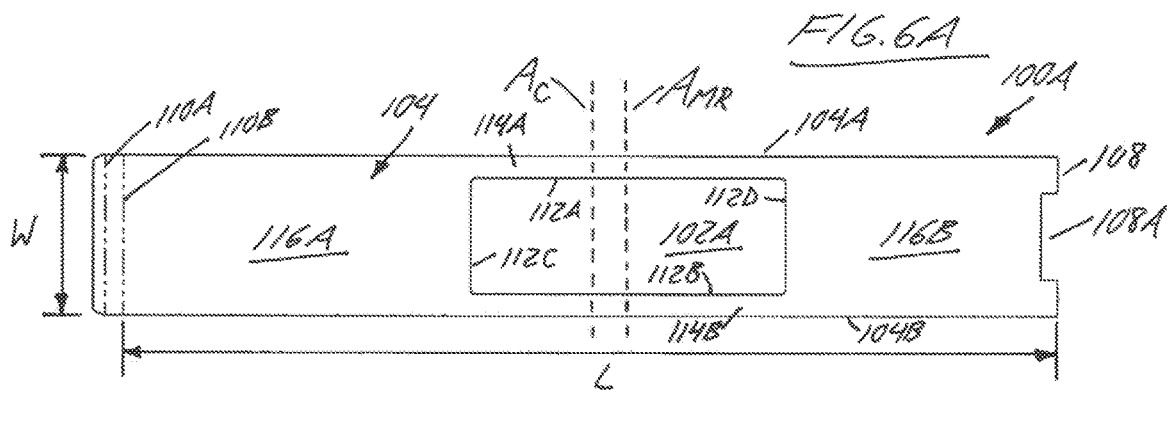
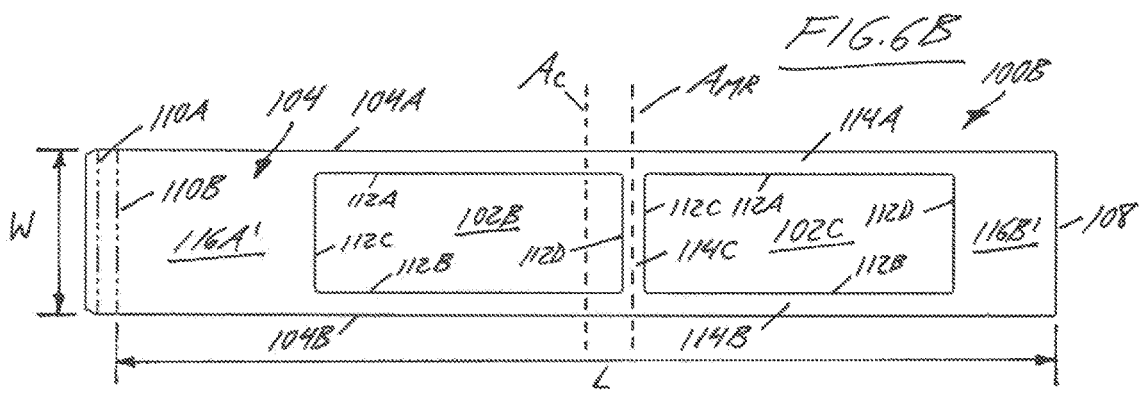
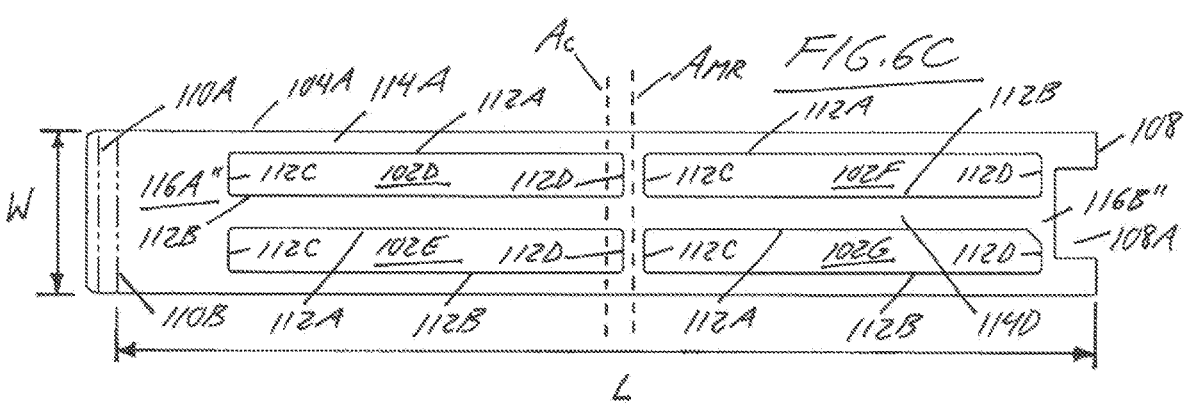

CONCAVE COVER PLATES FOR
IMPROVING OPERATIONAL
PERFORMANCE IN A COMBINE
HARVESTER

FIELD OF THE INVENTION

The present invention relates generally to combine har-
vesters, and more particularly relates to performance opti-
mization thereof through modification of concave grates that
underlie and cooperate with an overlying rotor whose driven
rotation is used to thresh and separate the crop material as it
is advanced helically and axially around the driven rotor.

BACKGROUND

In the agricultural industry, a combine harvester is a
vehicle used for the harvesting of agricultural crops. Prior art
combine harvesters are typically composed of several sys-
tems to pick, thresh, separate, clean and retain the grain from
the particular crop being harvested. For example, in one type
of prior art combine harvester's threshing system, the crop
travels axially parallel to and helically around the rotational
axis of one or more rotary processing devices commonly
referred to as rotors. In other prior art combine harvester's
threshing systems, during at least a portion of its travel
through the system, the crop travels in a transverse or
tangential direction relative to the rotational axis of a rotary
processing device commonly referred to as a threshing
cylinder. In each of the prior art threshing systems, crop
material is processed between rasp elements attached to the
periphery of a rotary device and arcuate grates, usually
foraminous, stationary, concave threshing and separating
grates that at least partially wrap around the rotor in roughly
circumferential and concentric relation thereto. The crop
material travels around the rotary cylinder and is "wedged"
in between the rotary cylinder and threshing concaves
causing the grain to be removed from the stalk.

For example, Regier (U.S. Pat. No. 9,215,845) discloses
an exemplary prior art combine harvester. As shown in FIG.
1, the depicted combine harvester 10 has a single axial flow
rotary processing system 12 that extends generally parallel
with the path of travel of the combine harvester 10, also
referred to herein as a longitudinal direction thereof in which
the combine harvester's front and rear ends are set apart
from one another. This longitudinal direction sets a direc-
tional reference frame in which the terms front and rear are
also used herein to label various parts or features of the
combine harvester 10 and the present invention. While the
illustrated context of the present invention is that of a
combine harvester with a single axial flow rotary processing
system, the principles of the present invention are not
limited to such context.

The exemplary prior art combine harvester 10 depicted in
the illustrated embodiment includes a harvesting header (not
shown) at the front of the machine that picks or cuts the
harvested crop and delivers the collected crop material to the
front end of a feeder house 14. A conveyor 16 moves the
crop material rearwardly within the feeder house 14 until
reaching the processing system 12. With reference now to
FIG. 2, the illustrated embodiment of the exemplary prior art
processing system 12 features a rotor 20 that has an infeed
auger 22 on the front end thereof, and is rotatably driven
about a rotor axis lying longitudinally of the combine
harvester 10. The auger 22 and rotor 20 advance the crop
material axially/longitudinally through the processing sys-
tem 12 for threshing and separating. The rotor 20 typically includes a plurality of rasp-like elements 55, configured
about the rotor's peripheral surface. The rotor is partially
encased at its underside by a series of concave threshing
grates 24 underlying a front lengthwise segment of the rotor
and a rearwardly neighbouring series of concave separator
grates 26 underlying a rear lengthwise segment of the rotor.
As the crop material moves around and in-between the
rasp-like elements 55 and the concave threshing grates 24,
the crop is threshed. Any free grain, that has been threshed,
falls through openings in the concave threshing grates 24
and the concave separator grates 26 and is retained by the
combine harvester 10.

Generally speaking, the crop material entering the pro-
cessing system 12 moves axially and helically through the
system during threshing and separating. During such travel
the crop material is threshed and separated by rotor 20
operating in cooperation with a concave foraminous sepa-
rator 23 composed one or more such concave threshing
grates 24 and one or more such concave separator grates 26,
with the grain escaping through openings of the concave
threshing grates 24 and concave separator grates 26 into an
underlying cleaning mechanism 28 (FIG. 1). Bulkier stalk
and leaf material is retained by the concave threshing grates
24 and separator grates 26, and is ejected out of the
processing system 12 at the rear of the combine harvester 10.
The cleaning mechanism 28 includes a set of oscillating
sieves with small openings therein through the grain can fall,
while the separated chaff cannot, and typically also includes
a blower (not shown), which provides a stream of air
directed upwardly through the sieves from therebelow and
out the rear of the harvester 10 so as to exhaust the lighter
chaff out the rear of the harvester while the heavier grain
migrates downwardly toward the bottom of the harvester to
a clean grain auger 30. This auger 30 delivers the clean grain
to an elevator (not shown) that transfers the grain to a
storage bin 34 on top of the machine, from which it is
ultimately unloaded via an unloading spout 36.

The plurality of concave threshing grates 24 and concave
separator grates 26 are arranged in side-by-side relation to
one another in the longitudinal/axial direction the processing
system 12 to form the foraminous separator 23, which in
turn forms part of what may be considered a tubular housing
38 that concentrically receives rotor 20 and serves as part of
processing system 12. In the illustrated example of FIGS. 1
and 2, there are three concave threshing grates 24 and three
concave separator grates 26 that collectively form the
foraminous separator 23 and bottom part of the tubular
housing 38. However, it is understood that more or fewer
threshing concave grates 24 and concave separator grates 26
may alternatively be used. The concavity of the threshing
and separator grates 24, 26 refers to the shape at interior
sides thereof that face toward the rotor, as opposed to the
convexly shaped exterior sides thereof that face away from
the rotor. As is known in the art, the tubular housing 38 may
also include an internally concave and externally convex top
part (not shown) that extends longitudinally of the housing
38 in overlying relation to the rotationally driven rotor. The
concave threshing grates 24 and concave separator grates 26
are adjustably movable toward and away from rotor 20 to
adjust the running clearance between the rotor 20 and the
concave threshing and separator grate assemblies 24, 26, and
to thereby change the shape of the threshing and separating
regions, as is known in the art and need not be further
discussed herein.

As shown in FIG. 3A, a concave threshing grate 40
typically includes a matching pair of arcuate, elongated and
spaced-apart side rails 42A, 42B oriented generally transverse to the longitudinal axis of the rotor 20 so that the arcuate spans of these rails span angularly around a fraction of the rotor's circumference in a position therebeneath. The side rails 42A, 42B are spaced apart from one another in the axial/longitudinal direction, whereby the side rails can be more particularly identified as front side rail 42A and rear side rail 42B owing to their relative proximities to the front and rear ends of the combine harvester 10. A parallel series of axial bars 44 spaced at predetermined intervals from one another along the arcuate span of the side rails 42A, 42B span axially/longitudinally between the two side rails 42A, 42B. End plates 46A, 46B are typically affixed between the side rails 42A, 42B at terminal ends of their arcuate spans, As shown, one of these ends plates 46B may embody or be accompanied by a hooked end-bracket 48 at the respective terminal end of the grate's arcuate for installed support of the concave threshing grate 40 in the combine harvester 10 in a known manner, though such mounting details may vary from one combine harvester to another. End portions of the axial bars 44 overlay upper edges of the side rails 42A, 42B so as bear against the same. One or more arcuate mid-rails 52 of matching or similar shape and configuration to the front and rear side rails 42A, 42B is/are typically positioned between and parallel to the front and rear side rails 42A, 42B at axially spaced distances therefrom to further support the axial bars 44. While the plurality of axial bars 44 shown FIGS. 3A to 4C are depicted as notched round bars each having a generally round cross-section with a flattened notch at one of its two upper quadrants, will be appreciated by those skilled in the art that the axial bars may have any variety of cross-sectional shape, such as fully-round, flat-topped round, oval, rectangular, square or polygonal.

To further set the context of the present invention, FIG. 3B illustrates an exemplary concave threshing grate assembly composed of a front concave threshing grate 40A and a neighbouring second concave threshing grate 40B situated rearwardly adjacent thereto, of which each concave threshing grate 40A, 40B is of the same type illustrated in FIG. 3A. These two concave threshing grates 40A, 40B reside in side-by-side relation to one another with the rear side rail 42B of the front concave threshing grate 40A in closely adjacent face-to-face relation to the front side rail 42A of the second concave threshing grate 40B, thus resembling the installed relationship in which such two concave threshing grates 40A, 40B would reside relative to one another when installed in the processing system 12 of the combine harvester 10. As shown, the front side rail 42A of the front concave threshing grate 40A may have a front lip 54 attached thereto in a position jutting forwardly therefrom in radially outward flaring relation to the notched top edge of this front side rail 42A. This optionally lip-equipped front side rail 42A of the front concave threshing grate 40A denotes a forwardmost intake end of the concave threshing grate assembly and the overall concave foraminous separator 23, thus coinciding with an entrance end of the tubular housing 38 through which the crop material is first admitted to the processing system 12. The second concave threshing grate 40B denotes the second frontmost concave threshing grate, of which only the front concave threshing grate 40A is of more immediately adjacent relation to this entrance of the processing system. The concave foraminous separator 23 will typically also include at least one concave separator grate 26 installed rearwardly of the two illustrated concave threshing grates 40A, 40B of the concave threshing grate assembly, and optionally may include one or more additional concave threshing grates installed rearwardly of the first two concave threshing grates 40A, 40B and in front of the one or more concave separator grates. That said, only the first two concave threshing grates 40A, 40B of the concave foraminous separator 23 are illustrated herein, as this is the area of processing system 12 at which the present invention will most typically be installed and used.

It is known practice in the prior art to modify the physical characteristics of one or more of the concave threshing grates of a combine harvester 10 by installing additional hardware thereon that effectively closes off, or reduces the size of or quantity, of the openings in the concave threshing grate, with the resultant effect of modifying the threshing action performed through the cooperation of the rotor with the modified concave threshing grates. For example, U.S. Pat. No. 11,122,743 of Robertson discloses examples of concave cover plates that are fastened in place between the arcuate side rails of the concave threshing grates at the convex exterior sides thereof to fully or partially close off the openings in the concave threshing grates. Embodiments in Robertson include a full-width unperforated cover plate that spans a full axial width and full circumferential length of the respective concave threshing grate between the side rails thereto so as to fully close the entirety of openings in the respective concave threshing grate, a full-width perfo-rated cover plate with an arrayed set of holes laid out over a full length and width thereof to partially close off the openings in the concave grate in uniform fashion across the full axial width and full circumferential length of the con-cave threshing grate, and an adjustable-width perforated cover plate with a likewise arrayed set of holes distributed among both a main plate and smaller second plate that can be slidably adjusted relative to the main plate to modify a degree of overlap therebetween in the axial direction of the concave, and thereby adjust the effective width of the combined cover plate, and thereby dictate how much of the concave grate width is covered by the adjustable cover plate.

Having set the context of the present invention through the foregoing description, the inventor of the subject appli-cation came to realize a problem in the type of combine harvester discussed above, particularly the realization that less than optimal performance and efficiency of the combine harvester is attributable to uneven loading of the sieves of the cleaning mechanism 28 from the processing system 12, where the revolving action between the rotor and the con-cave threshing and separating grates causes the threshed grain to be distributed more to one side of the sieves than the other. The result is that the effectiveness of the intended cleaning action imparted by sieves can be negatively impacted, and the overall cleaning capacity of the combine harvester is underutilized, denoting less than optimal oper-ating efficiency of the machine. Accordingly, there is a need for a solution to address these performance related deficien-cies in a conventional axial flow combine harvester.

SUMMARY OF THE INVENTION

According to a first aspect of the invention, there is provided a method of adjusting operational characteristics of one or more concave grates of a combine harvester, said method installing thereon one or more concave covers each having one or more holes therein at positions by which an overall open space embodied in each of said one or more concave covers by said one or more holes is concentrated nearer to a circumferential center of the one or more concave grates than to two opposing circumferential ends of the one or more concave grates, thereby promote unloading of the one or more concave grates generally centrally of an arcuate circumferential span thereof.

According to a second aspect of the invention, there is provided a cover device for installation on a concave grate of a combine harvester to alter operating characteristics of said concave grate, said cover device comprising:

an elongated cover plate having a length dimension that is measured between two opposing ends of the cover plate and is arranged to lie in a circumferential directionality of the concave grate when installed thereon, and a lesser width dimension that is measured between two opposing sides of the cover plate and is arranged to lie in an axial directionality of the concave grate when installed thereon;

a set of one or holes in said elongated cover plate that penetrate therethrough in a thickness dimension the cover plate that is of orthogonal relationship to said length and width dimensions and is lesser than both said length and width dimensions;

wherein:

each hole of said set is fully surrounded on all sides thereof by intact solid areas of said cover plate; and the set of one or more holes are laid out that such that a distribution of overall open space embodied in the cover plate by said set of one or more holes is concentrated nearer to a mid-region reference axis than to either end of said cover plate, of which said mid-region reference axis is parallel to the width dimension and resides nearer to a lengthwise midpoint of the cover plate than to either end thereof in a position that resides within a circumferential mid-region of the concave grate when said cover plate is installed thereon.

According to a third aspect of the invention, there is provided concave grate assembly for a combine harvester, said concave grate assembly comprising:

one or more concave grates;

installed on said one or more concave grates, a set of two or more distinct concave covers having different respective hole layouts therein, sad set including at least a first concave cover and a second concave cover, of which the respective hole layout in the first concave cover spans a lesser circumferential distance outward from a circumferential midpoint of the one or more concave grates than the respective hole layout in the second concave cover, and said first concave cover resides nearer to an intake end of the one or more concave grates than said second concave cover.

According to a fourth aspect of the invention, there is provided a cover device for installation on a concave grate of a combine harvester to alter operating characteristics of said concave grate, said cover device comprising:

an elongated cover plate having a length dimension arranged to lie in a circumferential directionality of the concave grate when installed thereon, and a lesser width dimension arranged to lie in an axial directionality of the concave grate when installed thereon;

a set of one or holes in said elongated cover plate that penetrate therethrough in a thickness dimension the cover plate that is of orthogonal relationship to said length and width dimensions and is lesser than both said length and width dimensions;

wherein:

each hole of said set is fully surrounded on all sides thereof by intact solid areas of said cover plate;

a length of each hole in a direction matching said length dimension of the cover plate exceeds a width of each hole in a direction matching said width dimension of the cover plate;

on any widthwise reference axis that lies parallel to the width dimension to the cover plate and spans across any one or more holes of said set, said any one or more holes of the set spanned by said widthwise reference axis occupy at least 30% of the width dimension.

According to a fifth aspect of the invention, there is provided a cover device for installation on a concave grate of a combine harvester to alter operating characteristics of said concave grate, said cover device comprising:

an elongated cover plate having a length dimension that is measured between two opposing ends of the cover plate and is arranged to lie in a circumferential directionality of the concave grate when installed thereon, and a lesser width dimension that is measured between two opposing sides of the cover plate and is arranged to lie in an axial directionality of the concave grate when installed thereon;

a singular large hole in said cover plate that:

is fully surrounded on all sides thereof by intact solid areas of said cover plate;

spans more than 50% of the width dimension of the cover plate and less than 50% of the length dimension of the cover plate;

has a length measured parallel to the length dimension of the cover plate that exceeds a width of the hole measured parallel to the width dimension of the cover plate;

spans lengthwise across a mid-region reference axis that is parallel to the width dimension and resides nearer to a lengthwise midpoint of the cover plate than to either end thereof in a position that resides within a circumferential mid-region of the concave grate when said cover plate is installed thereon, whereby the hole promotes unloading of the concave grate more centrally of an arcuate circumferential span thereof than if said concave grate was uncovered by said cover plate.

According to a sixth aspect of the invention, there is provided a cover device for installation on a concave grate of a combine harvester to alter operating characteristics of said concave grate, said cover device comprising:

an elongated cover plate having a length dimension that is measured between two opposing ends of the cover plate and is arranged to lie in a circumferential directionality of the concave grate when installed thereon, and a lesser width dimension that is measured between two opposing sides of the cover plate and is arranged to lie in an axial directionality of the concave grate when installed thereon;

two large holes in said cover plate that:

are each fully surrounded on all sides thereof by intact solid areas of said cover plate;

each span more than 50% of the width dimension of the cover plate;

each have a length measured parallel to the length dimension of the cover plate that exceeds a width of the hole measured parallel to the width dimension of the cover plate;

each reside nearer to a concave-midpoint reference axis, which is parallel to the width dimension and resides nearer to a lengthwise midpoint of the cover plate than to either end thereof in a position that resides within a circumferential mid-region of the concave grate when said cover plate is installed thereon, than to a respective nearest one of the ends of the cover plate, whereby the two large holes promote unloading of the concave grate generally centrally of an arcuate circumferential span thereof.

According to a seventh aspect of the invention, there is provided a cover device for installation on a concave grate of a combine harvester to alter operating characteristics of said concave grate, said cover device comprising:

an elongated cover plate having a length dimension that is measured between two opposing ends of the cover plate and is arranged to lie in a circumferential directionality of the concave grate when installed thereon, and a lesser width dimension that is measured between two opposing sides of the cover plate and is arranged to lie in an axial directionality of the concave grate when installed thereon;

four large holes in said cover plate that:

are each fully surrounded on all sides thereof by intact solid areas of said cover plate;

each have a length measured parallel to the length dimension of the cover plate that exceeds a width of the hole measured parallel to the width dimension of the cover plate;

are arranged in two pairs, of which of which the two pairs are separated from one another by an intact crosswise strip of the plate that lies widthwise of the plate between the pairs, and the two openings of each pair are separated from one another by an intact lengthwise strip of the plate that lies lengthwise of the plate, and each pair resides nearer to a mid-region reference axis, which is parallel to the width dimension and resides nearer to a lengthwise midpoint of the cover plate than to either end thereof in a position that resides within a circumferential mid-region of the concave grate when said cover plate is installed thereon, than to a respective nearest one of the ends of the cover plate.

According to an eighth aspect of the invention, there is provided a concave grate assembly for a combine harvester, said concave grate assembly comprising one or more concave grates having installed therein a pair of covering devices, one of which is the covering device recited in the fifth aspect of the invention and the other of which is the covering device recited in the sixth aspect of the invention.

Preferably the covering device recited in fifth aspect of the invention resides closer to an intake end of the concave grate assembly than the concave covering device recited in the sixth aspect of the invention.

The assembly may further have installed thereon the covering device recited in the seventh aspect of the invention.

Preferably, of all of said covering devices, the covering device recited in the seventh aspect of the invention resides furthest from the intake end of the concave grate assembly.

BRIEF DESCRIPTION OF THE DRAWINGS

Preferred embodiments of the invention will now be described in conjunction with the accompanying drawings in which:

FIG. 4D is a cross-sectional view of the concave threshing grates of FIG. 4B as taken along line D-D thereof.

FIG. 4E is a cross-sectional view of the concave threshing grates of FIG. 4B as taken along line E-E thereof.

FIG. 4F is a cross-sectional view of the concave threshing grates of FIG. 4B as taken along line F-F thereof.

FIGS. 6A through 6C are isolated plan views of the three different types of cover plates shown in FIGS. 5A through 5C, but during an intermediate phase of their manufacture, prior to bending thereof into their final consumer-ready state ready for installation in a combine harvester.

DETAILED DESCRIPTION

Figure 1:
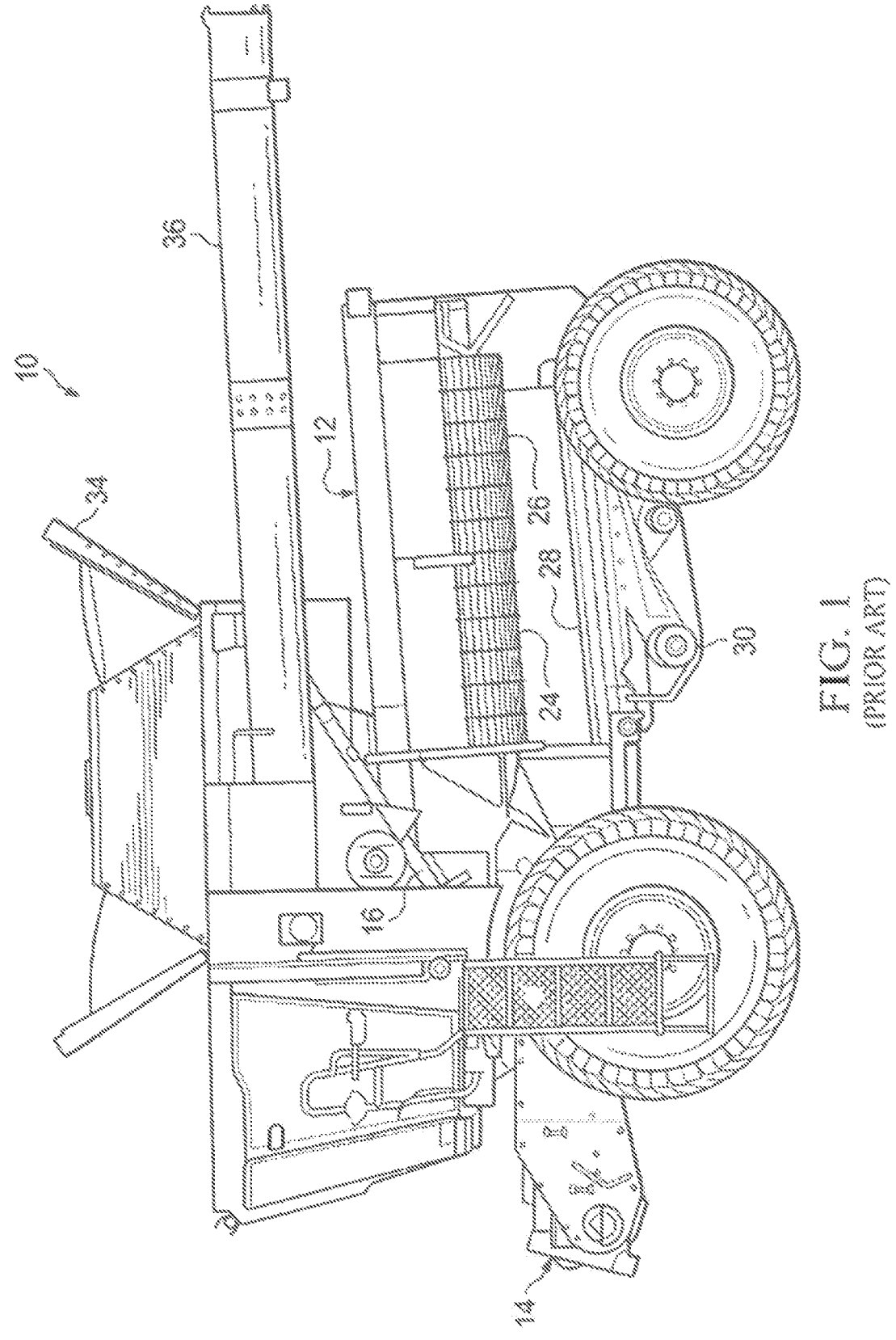
FIG. 1 is a schematic side elevational view of a prior art combine harvester having an axial flow processing system, with portion of the harvester cut away to reveal internal details thereof.
Figure 2:
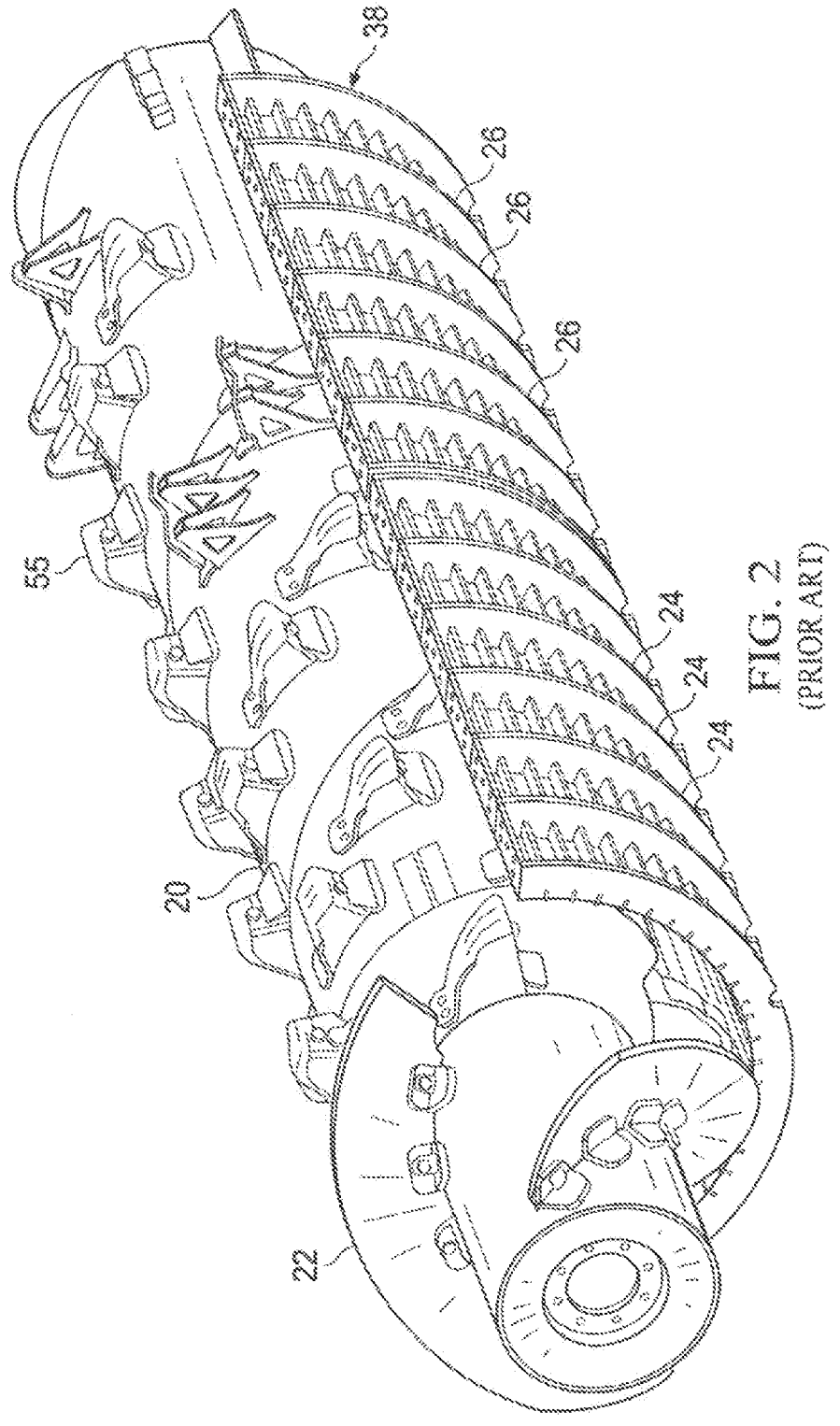
FIG. 2 is a perspective view of a known type of rotor and cooperating set of concave threshing and separating grates belonging to the processing system of the FIG. 1 combine harvester.
Figure 3A:
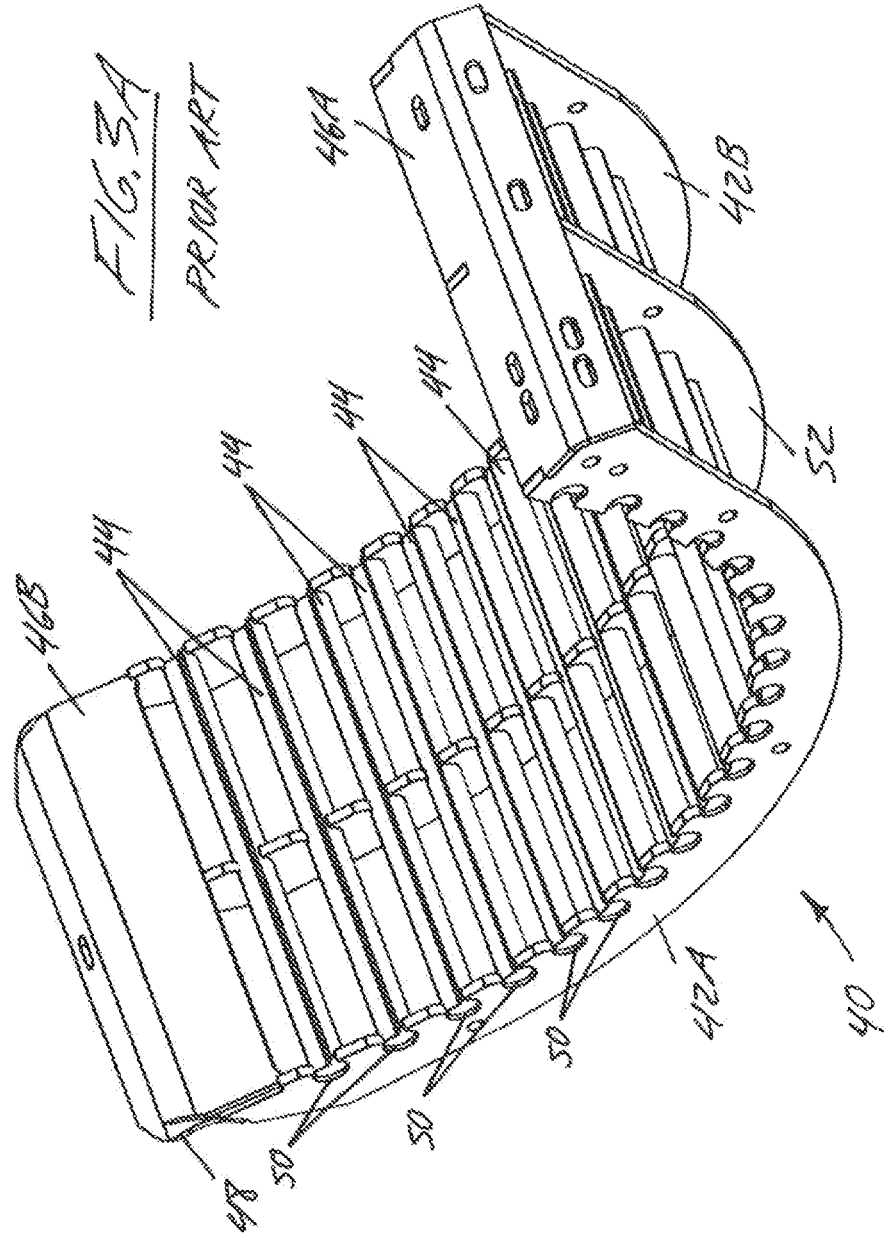
FIG. 3A is a perspective view of a singular isolated concave threshing grate of a known type usable in a processing system of matching or comparable type to that of FIGS. 1 and 2.
Figure 3B:
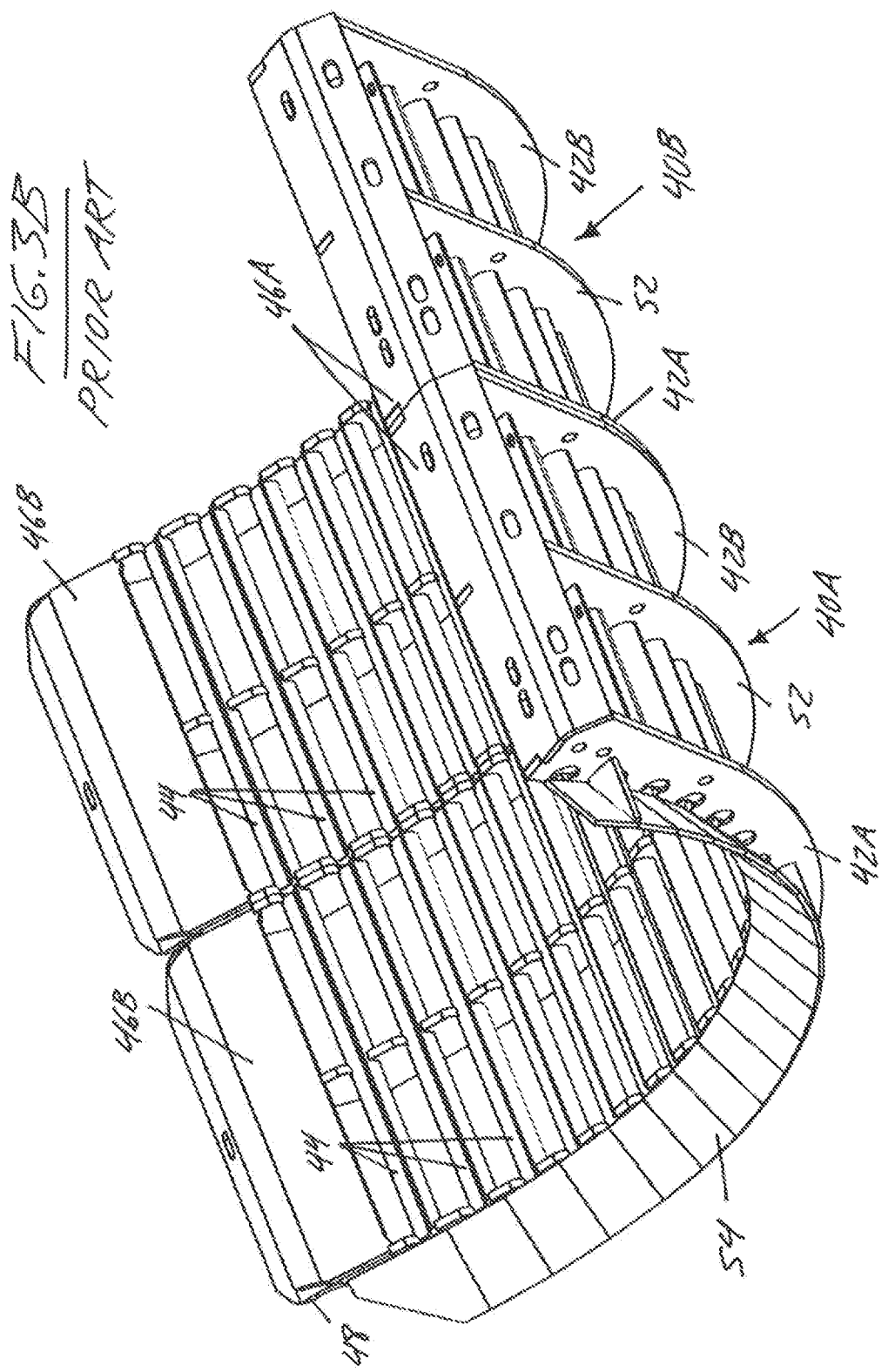
FIG. 3B is a perspective view of a neighbouring pair of concave threshing grates of the known type shown in FIG. 3A, as they would reside side-by-side in a combine harvester processing system of a matching or comparable type to that of FIGS. 1 and 2.
Figure 4A:
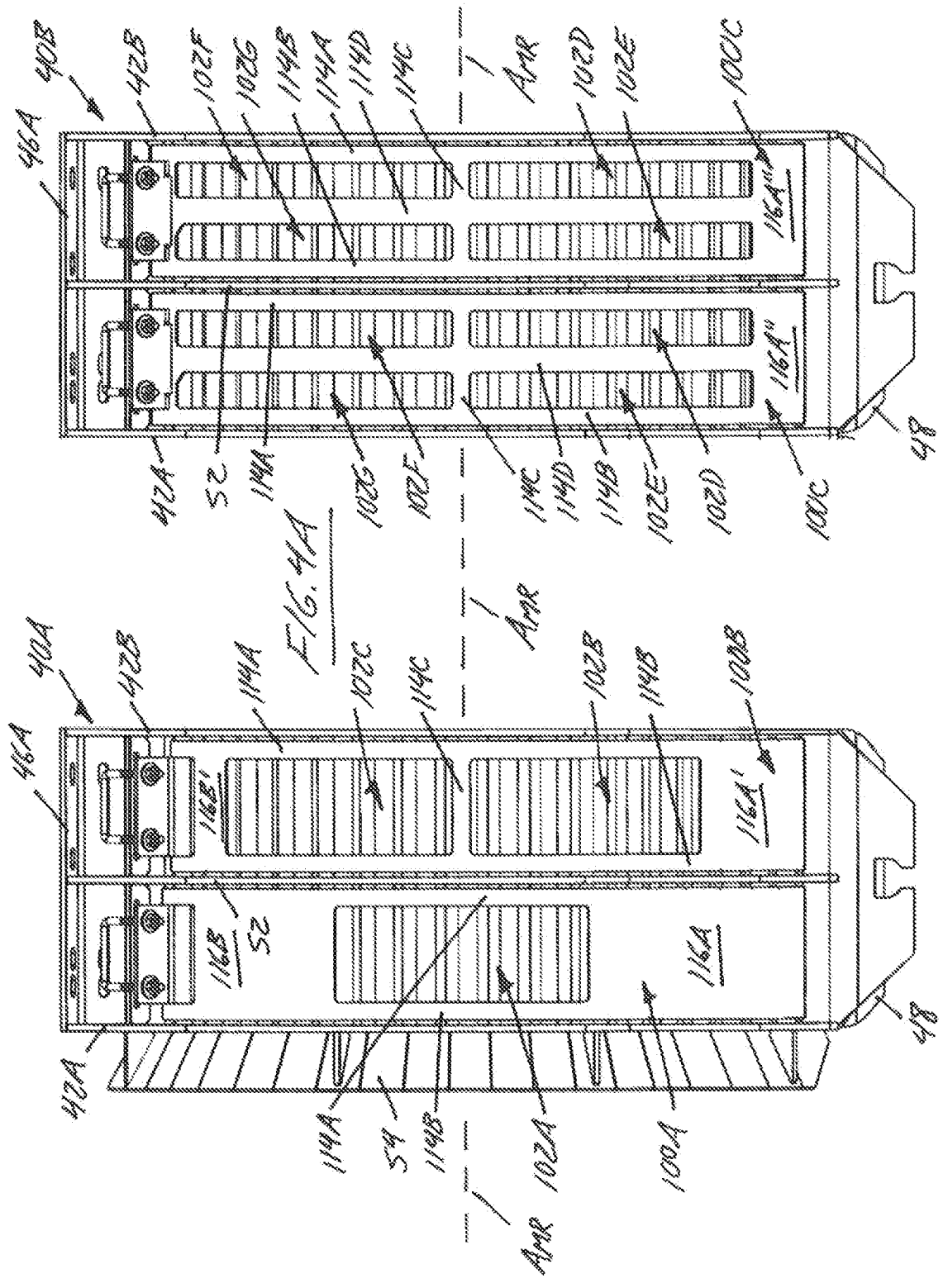
FIG. 4A is another bottom plan view of the concave threshing grates of FIG. 3B but in an exploded state separated from one another, and illustrating installation thereon of a set of novel concave cover plates according to the present invention.
Figure 4B:
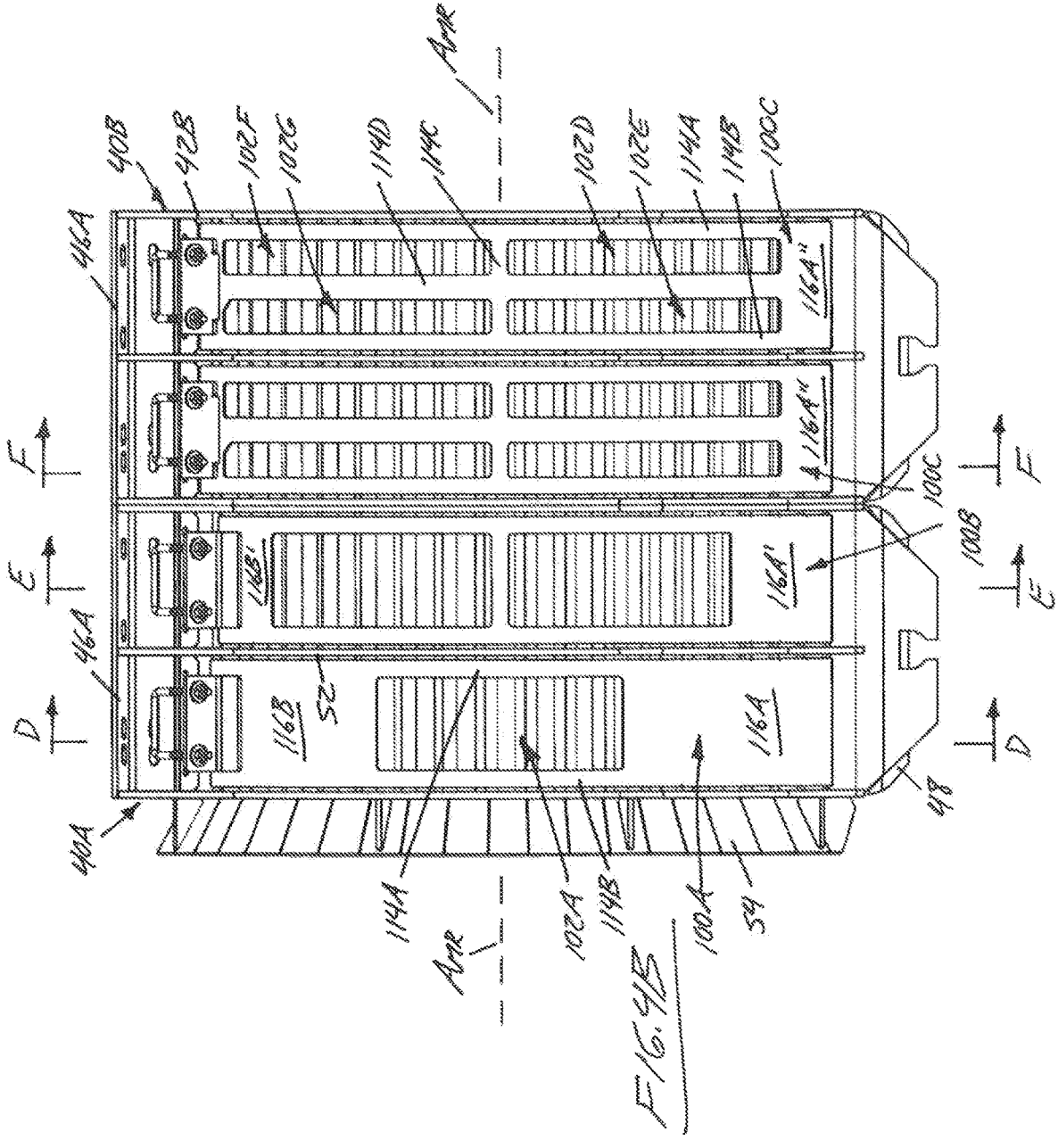
FIG. 4B is another bottom plan view of the concave threshing gates and installed cover plates of FIG. 4A, but with the concave threshing gates placed back into their neighbouring relationship of FIG. 3B to illustrate an operational context in which the novel cover plates are used in a combine harvester processing system.
Figure 4C:
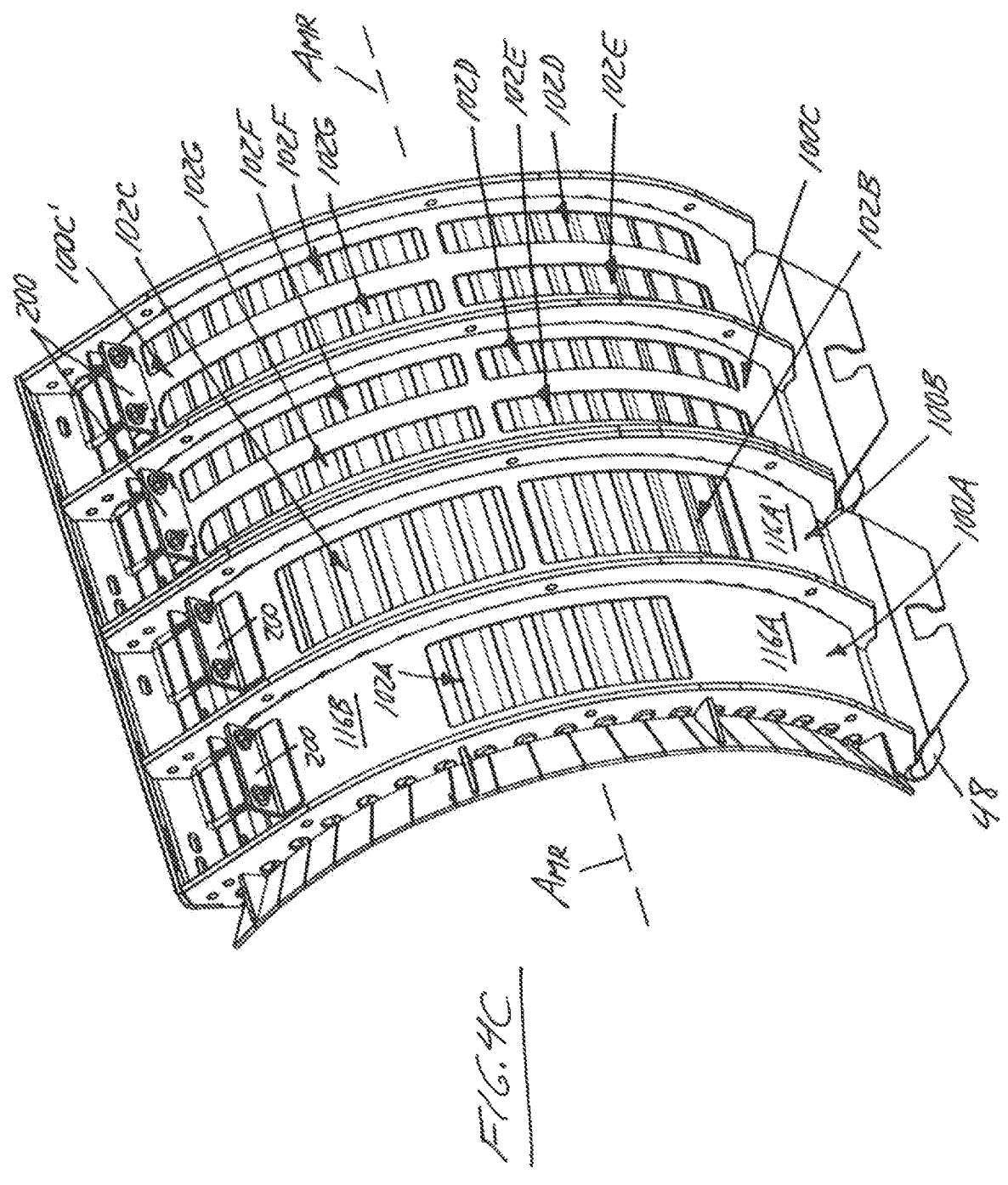
FIG. 4C is a perspective view of the concave threshing grates and installed cover plates of FIG. 4B.
Figures 5A, 5B, 5C:
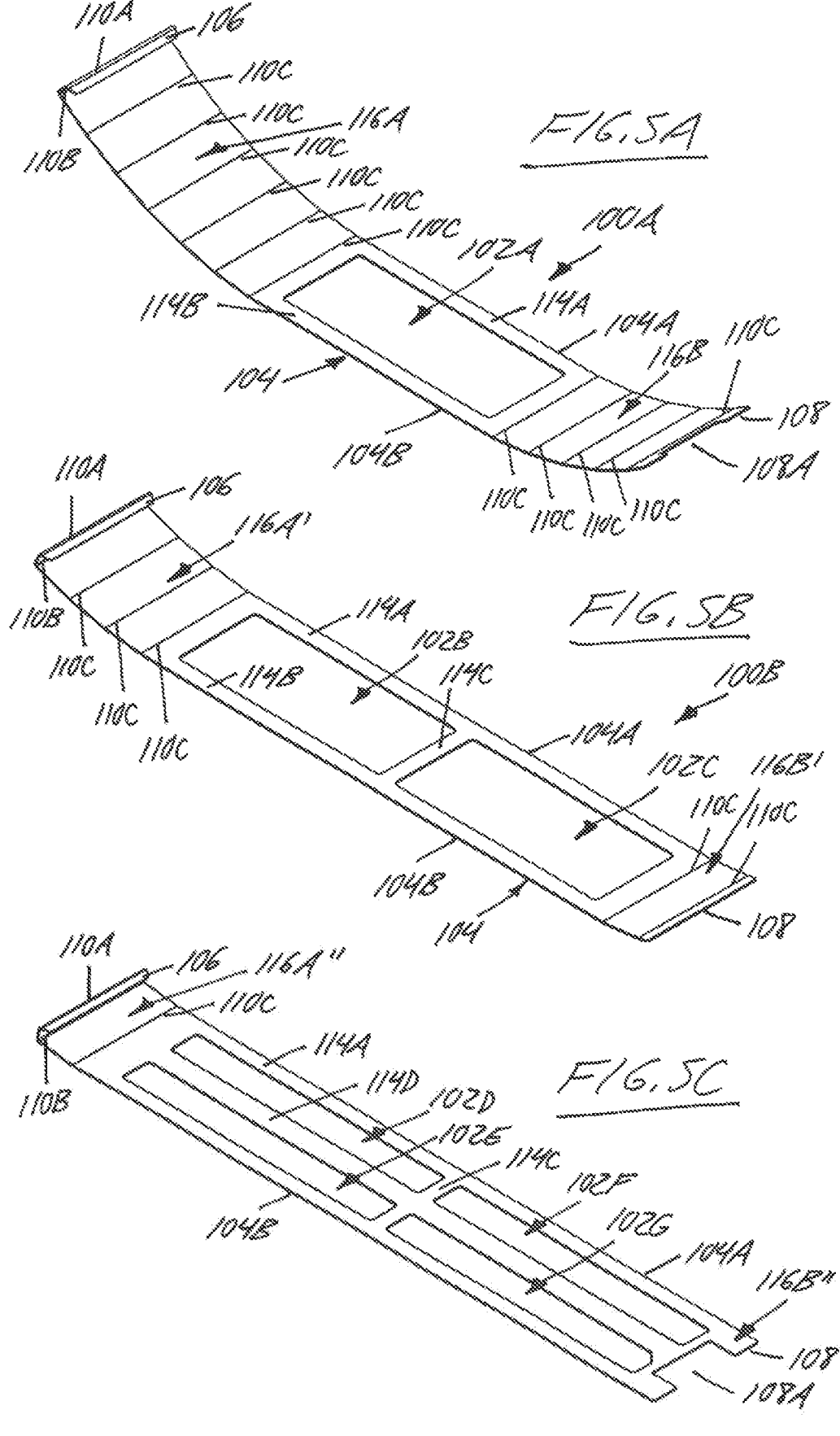
FIGS. 5A through 5C are isolated perspective views of three different types of cover plates found among the installed cover plate set of FIGS. 4A through 4C.

FIGS. 5A-5C illustrate three different concave cover devices of the present invention for installation on concave grates of a combine harvester, and more specifically, for typical installation on one or more concave threshing grates 40A, 40B thereof, as illustrated in FIGS. 4A-4C. For brevity, the concave threshing grates 40A, 40B denoting the installed operating environment of the concave cover devices of the illustrated embodiment are also referred to herein simply as concave grates 40, 40B, and concave cover devices are likewise also referred to herein simply as covers, or concave covers. The three different types of concave covers in the illustrated embodiment include a single-hole cover 100A with a singular large hole 102A therein, a dual-hole cover 100B with two large holes 102B, 102C therein, and a quad-hole cover 100C with four large holes 102D, 102E, 102F, 102G therein.

Each cover 100A-100C is composed of an elongated metal plate 104 of greater length L than width W. The width W of the plate 104 is dimensioned to fit between an adjacent pair of the arcuate rails 42A, 42B, 52 of one of the concave threshing grates 40A, 40B, for example between the mid-rail 52 and either one of the front and rear side rails 42A, 42B, and is dimensioned to occupy a substantial entirety of the distance between that adjacent pair of arcuate rails. In one preferred embodiment, the width W dimension of the plate 104 measures approximately or exactly 6-inches. In the illustrated embodiment, each plate 104 has a hooked end 106 at which the plate is bent into a hook shape, for hooked engagement of the hooked end 106 around a respective endmost axial bar of the concave grate's series of axial bars 44. In the illustrated embodiment, the endmost axial bar around which the hooked end 106 of the plate 104 is engaged refers to the axial bar nearest to end plate 46B and hooked bracket 48 of the concave grate 40A, 40B. As used herein, the length L of each plate 104 refers to the length of the plate from this hooked end 106 to an opposing end 108 of the plate 106, which lacks an integrally bent hook of type found at hooked end 106. FIG. 6A shows the plates 104 in a flat form during the manufacture of the covers 100A-100C, before bending of the hooked end 106, whose hooked shape is formed by bending of the plate at two hook-forming bend lines 110A, 110B near the terminus of the initially flat plate 104. In this initially flat state of the plate 104, the length dimension L of each cover 100A-100C thus refers to the dimension measured from the second end 108 of the plate 104 to the hook-forming bend line 110B situated nearest to the second end 108 of the plate 104. During the bending stage of the cover's manufacture, the plate 104 is bent by at least 90-degrees at each of the two hook-forming bend lines 110A, 110B (for example, 90-degrees at bend line 110A, and 95-degrees at bend line 110B), whereby these two bends in the plate 104 cooperatively form the hook shape of the integrally hooked end 106.

To encourage better conformance of the bent plate 104 of each cover 100A-100C with the convex exterior side of the concave grate 40A, 40B when installed thereon, the bending operation performed during manufacture of each cover may include one or more additional bends imparted to the plate 104 at one or more additional bend lines 110C, at each of which a bend of lesser angulation than those imparted at the hook-forming bend lines 110A, 110B is imparted to the plate 104, for example a bend of approximately or exactly 6.5 degrees in one preferred embodiment. Such additional bend lines 110C are shown in FIGS. 5A-5C, which show the respective plates 104 after completion of the bending operations thereon, whereby FIGS. 5A through 5C show the metal plates in their bent form each having at least some degree of angulation of the plate, in its length dimension L, out of the purely flat plane it initially occupied, making it easier to force the plate 104 into a generally conforming arc-like profile against the convex exterior side of the concave grate 40A, 40B.

The bend lines 110A-110C of each plate are included only at unperforated regions of the plate unoccupied by the one or more holes 102A-102G that penetrate through the plate 104 in a thickness dimension thereof that lies orthogonally of the length and width dimensions L, W of the plate 104. In the illustrated embodiment, the single-hole cover 100A includes eleven additional bend lines 110C, the dual-hole cover 100B includes a lesser quantity of five additional bend lines 110C, and the quad-hole cover 100C includes an even lesser quantity of only one additional bend line 110C. From this, it can be seen that the number of bend lines increases with the relative percentage of the overall plate area occupied by the unperforated regions, as the perforated region of each plate 104 characterized by the presence the cover's one or more holes 100A-100F has a lesser stiffness that the unperforated regions lacking any such holes, whereby the unperforated region does not require the inclusion of pre-formed bends therein to nicely conform with the convex exterior side of the concave grate 40A, 40B during installation thereon.

Each hole 102A-102G of each cover 100A-100C is fully surrounded on all sides thereof by intact solid areas of the respective plate 104. Each hole 102A-102G of the illustrated embodiment is substantially, if not entirely, rectangular in shape, and has two lengthwise sides 112A, 112B running parallel to the length dimension L of the plate, and thus parallel to two lengthwise perimeter edges 104A, 104B of the plate 104 itself, and two widthwise sides 112C, 112D running perpendicularly of the lengthwise sides 112A, 112B in parallel relation to the width dimension D of the plate that is measured perpendicularly between the two lengthwise perimeter edges 104A, 104B thereof. Each hole 102A-102G of the illustrated embodiment is elongated in the lengthwise direction, whereby its two lengthwise sides 112A, 112B are greater in length than its widthwise sides 112C, 112D. In the illustrated embodiment, only hole 102G deviates slightly from a four-sided rectangular shape, with a small oblique truncation at one corner of the otherwise rectangular shape of the hole, though the degree to which each elongated hole is truly rectangular or not, or some other elongated shape, may vary in other embodiments.

Referring first to the single-hole cover 100A, whose respective plate 104 is shown in FIGS. 5A and 6A, the intact solid areas of the plate 104 surrounding the singular hole 102A include two marginal strips 114A, 114B of the plate 104, each occupying the area between a respective one of the hole's lengthwise sides 112A and a respective nearest one of the plate's lengthwise edges 104A, 104B; a first unperforated region 116A spanning from a first one of the hole's widthwise sides 112C to bend line 110B of the hooked first end 106 of the plate 104 (i.e. to the nearest bend line 110B thereof); and a second unperforated region 116B spanning from the second one of the hole's widthwise sides 112D to the opposing second end 108 of the plate 104. Each of said first and second unperforated regions 116A, 116B is a solid region of the plate lacking any penetrative through-holes fully surrounded by intact areas of the plate, or at least lacking any such penetrative, fully-surrounded holes of sufficient size to allow grain to fall therethrough. In the illustrated example of single-hole cover 100A, the second end 108 of the plate has a rectangular notch 108A therein, which is not fully surrounded by intact areas of the plate does not detract from the "unperforated" character of the region 116B at which this notch 108A resides.

In the lengthwise direction of the plate 104 corresponding to the length dimension L thereof, the combined length of the two unperforated regions 116A, 116B exceeds the length of the singular hole 102A, whereby the hole 102A spans less than half the length L of the plate 104. In the first concave cover 100A, the perforated region of the plate's length refers to that occupied by the singular hole 102A and the two marginal strips 114A, 114B, and thus spans from one end (widthwise side 112C) of the hole 102A to the other (widthwise side 112D). In the illustrated example, the singular hole 102A is centered in the width dimension W of the plate 104, whereby the two marginal strips 114A, 114B are of equal width breadth to one another in the width dimension W of the plate. The hole 102A preferably spans at least 50% of the width dimension W of the plate, more particularly spanning at least 60% in some embodiments, at least 70% in some embodiments, no more than 80% in some embodiments, and no more than a lower maximum of 75% in some other embodiments. For example, prototypes with a plate width W of 6 inches and a hole width of 4⅜ inches, thus spanning approximately 73% of the plate width W, were found to perform effectively.

In the length dimension L of the plate 104, the singular hole 102A is centered on a mid-region reference axis $A_{MR}$ running widthwise of the plate 104, and whose position is described herein with reference to a parallel central reference axis $A_C$ that resides centrally of the length dimension L of the plate 104. In the illustrated embodiment, the mid-region reference axis $A_{MR}$ and the central reference axis $A_C$ are not coincident with one another, though they may be in other embodiments. Instead, the mid-region reference axis $A_{MR}$ is slightly offset from the central reference axis $A_C$ in the lengthwise dimension L of the plate 104, toward the non-hooked second end 108 of the plate 104 in the illustrated instance, though again this need not necessarily be the case in every instance of an offset relationship between the mid-region reference axis $A_{MR}$ and the central reference axis $A_C$. In any event however, the mid-region reference axis $A_{MR}$ on which the hole 102A is centered is nearer to the central reference axis $A_C$ than to either end 106, 108 of the plate 104, whereby the singular hole 102A occupies a mid-region of the plate 104 of notably offset distance from the two ends 106, 108 thereof. In some embodiments, the offset lengthwise distance between the two reference axes $A_{MR}$ and $A_C$ is 15% or less of the plate length L, and more particularly 10% or less in some embodiments.

Each end of the hole 102A (i.e. each widthwise side 112C, 112D thereof), which also denotes a respective end of the perforated region of the plate 104 in this single-hole example, is nearer to both the mid-region reference axis $A_{MR}$ and the central reference axis $A_C$ than it is to the respectively neighbouring end 106, 108 of the plate 104. That is, widthwise side 112C of the hole 102A is nearer to both of the two reference axes $A_{MR}$ and $A_C$ than to the hooked end 106 of the plate 104, and opposing widthwise side 112D of the hole 102A is nearer to both of the two reference axes $A_{MR}$ and $A_C$ than to the opposing non-hooked end 108 of the plate 104. The singular hole 102A, and thus the perforated region whose length matches that of the singular hole 102A in the instance of the single-hole cover 100A, preferably spans at least 20% of the length dimension L of the plate 104, and more particularly spans at least 25% thereof in some embodiments, and at least 30% in some embodiments. The hole and perforated region of the single-hole cover 100A preferably span no more than 50% of the plate length L, more particularly spanning no more than 45% in some embodiments, no more than 40% in some embodiments, and no more than 35% in some embodiments. In the non-limiting example of illustrated embodiment, one of the unperforated regions 116A of the single-hole cover 100A spans a greater fraction of the plate's length L than spanned by the shared length of the perforated area and singular hole 102A. In the non-limiting example of illustrated embodiment, the other one of the unperforated regions 116B of the single-hole cover 100A spans a lesser fraction of the plate's length L than spanned by the shared length of the perforated area and singular hole 102A.

Turning now to the dual-hole cover 100B, whose respective plate 104 is shown in FIGS. 5B and 6B, the two holes 102B, 102C in the plate 104 of this cover 100B are laid out end-to-end with one another in the lengthwise direction of the plate 104, in symmetric relation to one another across a mid-region reference axis $A_{MR}$ of the plate 104, which coincides with that of the single-hole cover 100A when the single-hole cover 100A and dual-hole cover 100B are both installed on the front concave grate 40A of the combine harvester 10. The intact areas of the plate 104 around the two holes 102B, 102C of this dual-hole cover 100B once again include two marginal strips 114A, 114B of the cover plate, the first of which 114A is bound between first lengthwise edge 104A of the plate 104 and the nearest lengthwise sides 112A of the two holes 102B, 102C, and the other of which 114B is bound between second lengthwise edge 104B of the plate 104 and the nearest lengthwise sides 112B of the two holes 102B, 102C. In this cover 100B, the intact areas of the plate 104 also include an intact crosswise strip 114C that perpendicularly interconnects the two marginal strips 114A, 114B on the mid-region reference axis $A_{MR}$ at a position between the inner ends of the two holes 102B, 102C (i.e. the ends thereof nearest said mid-region reference axis $A_{MR}$, as denoted by widthwise side 112D of hole 102B and widthwise side 112C of hole 102C). A remainder of the intact areas is again denoted by first and second unperforated regions 116A', 116B', of which the first 116A' unperforated region in this case spans from the outer end (widthwise side 112C) of hole 102B to the hooked end 106 of the plate 104, while the second unperforated region 116B' spans from the outer end (widthwise side 112D) of hole 102C to the opposing non-hooked end 108 of the plate 104.

In the two-hole cover 100B, the perforated region spans from the outer end of one hole 102B to the outer end of the other hole 102C, and spans a greater fraction of the plate length L than the single-hole perforated region of the single-hole cover 100A. In the non-limiting context of the illustrated example of the dual-hole cover 100B, one of the unperforated regions 116A' is longer in the lengthwise dimension L than a half-length of each hole 102B, 102C, and thus longer than a quarter-length of the overall perforated region, though the other unperforated region 116B' need not be, as also denoted by the illustrated example. The widths of the two holes 102B, 102C are preferably equal to one another, as may be the lengths thereof, and their relative width to the overall plate width W is preferably the same as those contemplated above for the single-hole cover 100A, with prototypes of the dual-hole cover 100B having again proven effective with a hole width of 4⅜ inches and a plate width of 6 inches.

Each hole 102B, 102C in this dual-hole cover 100B may span the same relative fraction of the plate length L as contemplated above for various embodiments of the single-hole cover 100A. On the other hand, unlike in the single-hole cover 100A, the totality of the perforated region in the dual-hole cover 100B spans more than 50% of the plate length L, at least in the non-limiting example of the illustrated embodiment. The totality of the perforated region in the dual-hole cover 100B preferably spans no more than 80% of the plate length L, more particularly spanning no more than 75% in some embodiments, and no more than 70% in some embodiments.

In this same non-limiting context of the illustrated embodiment, the mid-region reference axis $A_{MR}$ of the dual-hole cover 100B is once again offset from the central reference axis $A_C$ in the length dimension L of the plate 104, again toward the non-hooked second end 108 of the plate, and preferably by an offset distance not exceeding 15% of the plate length L, and more particularly not exceeding 10% of the plate length L, though offset relation to the central reference axis $A_C$ in the other direction, or a coincident relationship between the two reference axes $A_{MR}$ and $A_C$ may be adopted in other variants of the dual hole cover 100B. In the illustrated example, both of the unperforated regions 116A', 116B' of the dual-hole cover 100B are each of lesser lengthwise measure than the perforated region, and more specifically, may each be of lesser lengthwise measure than each of the two holes 102B, 102C.

The breadth, in the lengthwise direction of the plate 104, of the intact crosswise strip 114C that borders and separates the inner ends of the two holes 102B, 102C is less than the length of each hole 102B, 102C, and less than the length of each unperforated region 116A', 116B' of the plate 104, and preferably doesn't exceed the combined breadth of the two marginal strips 114A, 114B, for example being less than 1.5 times the individual breadth of each of said two marginal strips 114A, 114B in some embodiments, and approximately or exactly equal to said individual breadth of one or both of said marginal strips 114A, 114B in some embodiments. The dual-hole cover 100B employs a single-row, end-to-end layout of its two holes 102B, 102C in the lengthwise direction of the plate 104. In another single-row, end-to-end, multi-hole variant of the cover (not shown), there may be more than two such holes residing end-to-end in a single row and each spanning the described substantial fraction of the plate width W, in which case the intact areas around the plurality of holes would include a respective additional cross-wise strip 114C for each additional hole included beyond the two-holes of the illustrated example, with the length of the perforated region still being denoted by the distance between the outer ends of the two endmost holes in the row of holes.

Just like the single-hole cover 100A, the collective open area embodied in the perforated region of the plate 104 by the one or more holes therein is concentrated nearer to the mid-region and central reference axes $A_{MR}$, $A_C$ (whether offset or coincident) than to either of the plate's two ends 106, 108. As a result, the single-hole and dual-hole covers 100A, 100B, when installed on one or more concave grates 40A, 40B, have the result of obstructing the openings of the concave grate(s) between the axial bars 44 thereof (inter-bar openings, for short), from the convex exterior side(s) of the concave grate(s), at end-regions of the concave grate(s) near which arcuate shape of the grate(s) terminate in what is referred to herein as a circumferential reference direction (owing to this arcuate shape lying in a generally circumferential relation to the rotation axis of the rotor 20). Meanwhile, the inter-bar openings of the grate(s) are left substantially or notably unobstructed at (a) mid-region(s) of the arcuate span(s) of the grate(s), where the hole(s) 100A-100C of the concave cover 100A, 100B reside. So, the unperforated regions of the plate 104 of each cover 100A, 100B block escape of the threshed grain through the grate openings at the end-regions of the concave grate(s), where more grain-on-grain rubbing and threshing will thus occur, potentially reducing grain damage compared to pure grain-on-concave threshing, while the hole(s) in the perforated mid-region of the plate 104 of each cover 100A, 100B allow grain to fall through the concave grate openings at the mid-region of the grate(s), which results in a more centered and even loading of the oscillating sieves of the cleaning mechanism 28.

Turning now to the quad-hole cover 100C, whose respective plate 104 is shown in FIGS. 5C and 6C, the four holes 102D, 102E, 102F, 102G in the plate 104 are laid out in two pairs, of which the first pair is composed of first and second holes 102D, 102E that reside side-by-side of one another in the width dimension W of the plate 104, and the second pair is composed of the third and fourth holes 102F, 102G that likewise reside side-by-side of one another in the width dimension W of the plate 104. The first and second pairs of holes are separated from one another by an intact crosswise strip 114C of the plate 104, which like that of the two-hole cover 100B, spans along a mid-region reference axis $A_{MR}$ between two intact marginal strips 114A, 114B of the plate 104 that run lengthwise thereof respectively along the two lengthwise perimeter edges 104A, 104B of the plate 104. In the quad-hole cover 100C, the first marginal strip 114A is bound between the first lengthwise edge 104A of the plate 104 and the nearest lengthwise sides 112A of the first and third holes 102D, 102F that reside end-to-end of one another across the intact crosswise strip 114C, and the second marginal strip 114B is bound between the second lengthwise edge 104B of the plate 104 and the nearest lengthwise sides 112B of the second and fourth holes 102E, 102G that likewise reside end-to-end of one another across the intact crosswise strip 114C. The intact areas of the plate around the four holes 102D-10G further include an intact lengthwise strip 114D that is bound between the inner lengthwise sides 112B of the first and third holes 102D, 102F and the inner lengthwise sides 112A of the second and fourth holes 102E, 102G. In the four-hole cover 100C, the perforated region of the plate 104 runs from the outer ends (widthwise sides 112C) of the first and second holes 102D, 102E to the outer ends (widthwise sides 112D) of the third and fourth holes (102F, 102G). The intact lengthwise strip 114D of the plate 104 thus runs from one end of the perforated area to the other, thereby joining together the two unperforated regions 116A", 116B" that are situated beyond those outer ends of the perforated area. The intact crosswise strip 114C and intact lengthwise strip 114D intersect and cross one another at a midpoint of the plate width W, and collectively form an intact cruciform between the four holes 102D-102G. The intact lengthwise strip 114D and the marginal strips 114A, 114B are preferably each of no greater breadth than each of the holes 102D-102G in the width dimension D of the plate 104, and more particularly may be of lesser breadth than each hole, as illustrated. Likewise, the breadth of the cross-wise strip 114C in the length dimension L of the plate 104 may be no greater than the widthwise breadth of each hole, and more particularly may be lesser than same. As shown, the intact lengthwise strip 114D may be wider than the marginal strips 114A, 114B, and/or wider than the crosswise strip 114C.

The two pairs of holes 102D-102E, 102F-102G in the quad-hole cover 100C reside symmetrically of one another across the mid-region reference axis $A_{MR}$, just like the two holes of the two-hole cover 100B, whereby first and third holes 102D, 102F are symmetric of one another across the mid-region reference axis $A_{MR}$, as are second and fourth holes 102E, 102G. Once again, the mid-region reference axis $A_{MR}$ is closer to the plate's central reference axis $A_C$ than to either end 106, 108 of the plate 104, and may be offset from the central reference axis $A_C$, preferably by a distance no more than 15% of the plate length L in some embodiments, and no more than 10% in some embodiments, just like in the other covers 100A, 100B, so that the mid-region reference axis $A_{MR}$ resides somewhere within a central 30% fraction, or more particularly a central 20% fraction, of the plate's length L. In the illustrated example, the mid-region reference axis $A_{MR}$ is once again offset from the plate's central reference axis $A_C$ in the direction toward the non-hooked end 108 thereof, though once again, this need not necessarily be the case in other embodiments.

The four holes 102D-102G of the quad-hole cover 100C are longer than the holes 102A-102C in the single-hole and dual-hole covers 100A, 100B, preferably each spanning more than 25% of the plate length L, more particularly spanning at least 30% thereof in some embodiments, at least 35% in some embodiments, no more than 45% in some embodiments, and no more than 42% in some embodiments. The totality of the perforated region in the quad-hole cover 100C, which in this case from the outer ends (widthwise sides 112C) of the first pair of holes 102D, 102E to the outer ends (widthwise sides 112D) of the second pair of holes 102F, 102G, spans a greater fraction of the plate length L than that spanned by the perforated regions of the single-hole and dual-hole covers 100A, 100B, preferably spanning at least 65% of the plate length L, more particularly spanning at least 75% in some embodiments, at least 80% in some embodiments, no more than 90% in some embodiments, and no more than 85% in some embodiments.

Aside from the intact marginal, crosswise and lengthwise strips 114A-114D of the plate 104 at the perforated region thereof, the remainder of the intact plate areas of the quad-hole cover 100C is again denoted by first and second unperforated regions 116A", 116B", of which the first 116A" unperforated region in this case spans from the outer end (widthwise sides 112C) of the first pair of holes 102D, 102E to the hooked end 106 of the plate 104, while the second unperforated region 116B" spans from the outer end (widthwise sides 112D) of the second pair of holes 102F, 102G to the opposing non-hooked end 108 of the plate 104. The widths of the four holes 102D-102G are preferably equal to one another, as may be the lengths thereof. Any side-by-side subset of the holes 102D-102G that are intersected by any same crosswise reference axis lying parallel to the width W of the plate 104 collectively occupy at least 30% of the plate width W, and more particularly at least 40% thereof in some embodiments, at least 45% in some embodiments, no more than 65% in some embodiments, no more than 60% in some embodiments, and between 50 and 60% in the illustrated example. For example, first pair of side-by-side holes 102D, 102E are commonly intersected by crosswise central reference axis $A_C$, and collectively occupy between 50 and 60% of the plate width W, as would the second pair of side-by-side holes 102F, 102G if another crosswise reference axis were drawn therethrough. The breadth, in the lengthwise direction of the plate 104, of the intact crosswise strip 114C is once again less than the length of each hole 104D-104G and less than the length of each unperforated region 116A", 116B" of the plate 104, preferably doesn't exceed the combined breadth of the two marginal strips 114A, 114B, for example being less than 1.5 times the individual breadth of each of said two marginal strips 114A, 114B in some embodiments, and less than 1.25 times thereof in some embodiments.

Having described in detail the hole layout and geometry of all three concave covers 100A-100C in relation to FIGS. 5A-5C and 6A-6C, attention is now turned to placement and use thereof on the concave grates 40A, 40B in FIGS. 4A through 4C. In the illustrated example, a set of four concave covers are installed on the concave grates 40A, 40B, the set being composed of one single-hole concave cover 100A, one dual-hole concave cover 100B, and two quad-hole concave covers 100C, 100C', installed in that order, from front to rear, on the first and second concave grates 40A, 40B. Single-hole concave cover 100A occupies a frontmost inter-rail space of the two concave grates 40A, 40B (i.e. the space between the front side rail 42A and mid-rail 52 of the first concave grate 40A), dual-hole cover 100B occupies a second-frontmost inter-rail space of the two concave grates 40A, 40B (i.e. the space between the mid-rail 52 and rear side rail 42B of the same first concave grate 40A), a first quad-hole concave cover 100C occupies a third frontmost inter-rail space of the two concave grates 40A, 40B (i.e. the front inter-rail space of the second concave grate 40B), and a second quad-hole concave cover 100C' occupies a fourth frontmost (and in the illustrated instance, rearmost) inter-rail space of the two concave grates 40A, 40B (i.e. the rear inter-fail space of the second concave grate 40B). The mid-region axes $A_{MR}$ of the four installed covers 100A-100C' are all aligned with one another, and lie axially of the concave grates (i.e. parallel to the axial bars 44 thereof).

In describing the coverage of the concave grates 40A, 40B by the installed concave covers 100A-100C', the circumferential length of each concave grate 40A, 40B is considered to span from an endmost one of the axial bars 44 at one end of series of axial bars 44 to another endmost one of the axial bars 44 at the other end of the series. As mentioned earlier, installation of each cover 100A-100C' may rely on hooked engagement of the hooked end 106 of the cover's plate 104 around one of these endmost axial bars of the concave grate 40A, 40B. As illustrated in FIGS. 4A-4C, a backside of each plate 104, referring to the side thereof that faces outwardly away from the axial bars 44 of the concave grate 40A, 40B in the cover's installed position thereon, may be equipped with at least one bracket 200 that stands proud of the backside of the plate 104, for example at or near the unhooked second end 108 thereof for use in tensionable coupling of the plate 104 to the concave grate using a latching mechanism, turnbuckle or other coupling device, examples of which are known in the art, and thus not described or illustrated in detail herein. The hooked bar engagement of the cover at one end and tensioned coupling at the other secures the cover plate in generally arcuate conformance against the axial bars of the grate 40A, 40B at the exterior side thereof. Such installation details are already known in the art, having been used for other commercially available concave cover plates, and are thus not illustrated or described herein in further detail. The circumferential length of the concave grate may be measured by the quantity of axial bars in the series, the distance measured along an arc occupied by the series of axial bars, or the angular measure along said arc.

The length L of each installed cover 100A-100C spans a full or near entirety of the circumferential length of the concave grate (or concave length, for short) on which the cover is installed. In the illustrated example, each concave grate 40A, 40B has twenty axial bars 44, of which the length L of each cover 100A-100C spans eighteen of those axial bars 44, with the non-hooked end 108 of each plate 104 stopping short of the last two bars of the series at the respective end thereof. Any such subset of the axial bars left unspanned by the cover may be referred to an unspanned subset for short), and the quantity thereof may vary is preferably no more than a maximum of five bars, and more preferably no more than three bars.

FIG. 4D shows a cross-sectional view of concave grate 40A at the frontmost inter-rail space thereof occupied by the single-hole cover 100A, in which reference plane P denotes a plane that bisects the singular hole 102A of the cover 100A at the mid-region axis $A_{MR}$. Using the concave grate's quantity of axial bars as the measure of the concave grate's circumferential length, it will be seen that reference plane P, and thus also the mid-region axis $A_{MR}$ that resides within said plane P, resides centrally of the grate's circumferential length, i.e. between the middle pair of axial bars, in the illustrated instance of an even quantity of axial bars, such that half the axial bars (ten bars, in the illustrated example) reside on each side of this reference plane P. The length of the singular hole 102A, and thus the matching length of the perforated mid-region of the cover 100A in this single-hole example, spans 30% (six of twenty bars) of the grate's circumferential length in this non-limiting context of the illustrated embodiment. The singular hole 102A of the single-hole cover 100A at the frontmost inter-rail space of the front concave grate 40A at the forwardmost intake end of the threshing grate assembly thus occupies a central 30% span (mid-region) of the front grate's circumferential length, where grain is thus allowed to fall through the front grate 40A, while the first and second unperforated regions 116A, 116B of the single-hole cover 100A occupy respective 35% (seven of twenty bars) and 25% (5 of twenty bars) spans (outer regions) of the frontmost inter-rail space, where grain is prevented from falling through the front grate 40A. In the illustrated embodiment, a 10% terminal region (2 of 20 twenty bars) of the grate's circumferential length is left unspanned by the single-hole cover 100A at one end of the grate's circumferential length, but may alternatively be covered by elongation of the cover's second unperforated region 116B' in other embodiments. The central span or mid-region of the concave grate 40A lined by the perforated mid-region of the single-hole cover 100A may vary in its fractional span of the grate's circumferential length, for example spanning at least 20% in some embodiments, at least 25% in some embodiments, no more than 40% in some embodiments, and no more than 35% in some embodiments. The location of the mid-region axis $A_{MR}$, denoting the center of the cover's perforated region, may also deviate from the central midpoint of the grate's circumferential length, for example by up to 15% in either direction in some embodiments, or up to a lesser maximum of 10% in other embodiments.

FIG. 4E shows a cross-sectional view of concave grate 40A at the rear inter-rail space thereof occupied by the dual-hole cover 100B, in which reference plane P again coincides with the mid-region axis $A_{MR}$, and once again bisects the perforated mid-region of the cover 100B, this time at the intact crosswise strip 114C that separates the two holes 102B, 102C of the perforated mid-region of the dual-hole cover 100B. Once again reference plane P, and the mid-region axis $A_{MR}$ contained therein, resides centrally of the grate's circumferential length, with an equal number of axial bars on each side of this reference plane P. In the illustrated example, the length of the perforated mid-region (the combined length of the two holes 102B, 102C plus the intact crosswise strip 114C therebetween) spans 60% (twelve of twenty bars) of the grate's circumferential length. The perforated mid-region of the dual-hole cover 100B that occupies the rear inter-rail space of the front concave grate 40A in neighbouring relation to the single-hole cover 100A thus occupies a central 60% span (mid-region) of the front grate's circumferential length, where grain is once again allowed fall through the front grate 40A, while the first and second unperforated regions 116A', 116B' of the dual-hole cover 100B occupy respective 20% (four of twenty bars) and 10% (two of twenty bars) spans (outer regions) of the front grate's rear inter-rail space, where grain is prevented from falling through the front grate 40A. In the illustrated embodiment, a 10% terminal region (two of twenty bars) is again left unspanned by the dual-hole cover 100B at one end of the grate's circumferential length, but may alternatively be covered by elongation of the cover's second unperforated region 116B' in other embodiments. The central span or mid-region of the front grate's rear inter-rail space lined by the perforated mid-region of the dual-hole cover 100A may vary in its fractional span of the grate's circumferential length, for example spanning at least 45% in some embodiments, at least 50% in some embodiments, no more than 75% in some embodiments, and no more than 70% in some embodiments. The location of the mid-region axis, denoting the center of the cover's perforated region, may once again deviate from the center of the grate's circumferential length, in either direction, for example up to 15% some embodiments, or up to a lesser maximum of 10% in other embodiments.

FIG. 4F shows a cross-sectional view of concave grate 40B, as it would appear at either of the inter-rail spaces thereof occupied by a respective one of the quad-hole covers 100C, 100C'. Reference plane P again coincides with the mid-region axis $A_{MR}$, and once again bisects the perforated mid-region of the cover, this time at the intact crosswise strip 114C that separates the two pairs of holes 102D-102E, 102F-102G in the perforated mid-region. Once again reference plane P, and the mid-region axis $A_{MR}$ contained therein, resides centrally of the grate's circumferential length, with an equal number of axial bars on each side of this reference plane P. In the illustrated example, the length perforated mid-region (the combined length of the two pairs of holes 102D-102G plus the intact crosswise strip 114C therebetween) spans 75% (fifteen of twenty bars) of the grate's circumferential length. The four hole layout embodied by the perforated mid-region of a quad-hole cover 100C optionally installed in the front inter-rail space of concave grate 40B in neighbouring relation to the dual-hole cover 100B in the rear inter-rail space of concave grate 40A, and the four hole layout embodied by the perforated mid-region of a second such quad-hole cover 100C' optionally installed in the rear inter-rail space of concave grate 40B in neighbouring relation to the first such quad-hole cover 100C, each thus occupy a central 75% span (mid-region) of the grate's circumferential length, where grain is once again allowed fall through the grate 40B, while the first and second unperforated regions 116A'', 116B'' of each such quad-hole cover 100C occupy respective 10% (two of twenty bars) and 5% (one of twenty bars) spans (outer regions) of the grate's respective inter-rail space, where grain is prevented from falling through concave grate 40B. In the illustrated embodiment, a 10% terminal region (two of twenty bars) is again left unspanned by the quad-hole cover 100C at one end of the grate's circumferential length, but may alternatively be covered by elongation of the cover's second unperforated region 116B'' in other embodiments. The central span or mid-region of either of the grate's inter-rail spaces lined by the perforated mid-region of a quad-hole cover 100A may vary in its fractional span of the grate's circumferential length, for example spanning as little as 60% in some embodiments, at least 65% in some embodiments, as much as 90% in some embodiments, and no more than 85% in some embodiments. The location of the mid-region axis $A_{MR}$, denoting the center of the cover's perforated region, may once deviate from the center of the grate's circumferential length, for example by up to 15% in either direction in some embodiments, or up to a lesser maximum of 10% in other embodiments.

Preferred implementations of the present invention include installation of at least two of the concave covers 100A-100C', particularly the single-hole over 100A typically installed at in the frontmost spot of the concave grates nearest to the intake end of the processing system 12, and whose hole layout at the perforated area has the least circumferential span relative to the grate on which its installed, in accompaniment by the dual-hole plate installed at a next-frontmost spot of the concave grates in neighbouring relation to the frontmost installed single-hole plate. This way, the frontmost inter-rail space of the grates where the crop material is first introduced to the processing system 12 has the largest fraction of its circumferential length covered (by the unperforated portions of the respective plate 104), to encourage a high degree of grain-on-grain threshing, with its relatively small uncovered fraction of grate openings concentrated a circumferential mid-region of the concave grate to encourage centralized unloading of the processing system 12 onto the sieves of the cleaning section 28 for even loading and optimal performance thereof. The next dual-hole cover 100B likewise has unperforated regions that fully close off circumferentially outer regions of its respective spot on the concave grates, to again provide more grain-on-grain thresh-ing than in use of uncovered grates, and again has its hole layout concentrated nearer to the circumferential midpoint of the grate to promote even loading of the sieves, but enlarges the circumferential span of its hole layout com-pared to the prior cover while decreasing the collective circumferential span of its unperforated regions. In the event of optional inclusion of one or both of the quad-hole covers 100C, 100C', this trend of increasing grate openness in a longitudinally rearward progression through the combine harvester continues, with another circumferential widening of the hole layout and circumferential narrowing of the unperforated regions of the cover(s), to allow more unload-ing of the grates as the threshed percentage of the crop material increases toward the rear of the threshing section. Subsequent concave grates situated rearwardly of the cover-equipped grate(s) 40A, 40B are left fully open, with no covers of any type installed. The result is a progressive increase of the effective unloading area of the concave grates in a rearward direction through the threshing section of the processing system, with collective open space in each cover (collectively define by the one or more holes 100A-100G in said each cover) being particularly concentrated nearer to the circumferential midpoint of the concave grate than to either circumferential end thereof to promote even loading of the sieves of the cleaning mechanism 28 for optimal performance and efficiency.

While the illustrated embodiment uses a single-hole cover as its "least open" cover for the most centrally focused unloading of the respective spot on the concave grates, it will be appreciated that the single-hole example may be replaced with an equivalent or comparable performing multi-holed plate whose perforated area is of similarly small circumferential span of the grate likewise concentrated near the circumferential midpoint thereof, much in the same way that it was contemplated above that the dual-hole cover of greater, and circumferentially wider, openness to serve as the second frontmost cover may instead be embodied by a plate with a row of three or more holes of collectively comparable lengthwise span of the plate length L. That said, splitting of the singular hole 102A into multiple holes, whether end-to-end holes separated by an intact cross-wise strip or side-by-side holes separated by an intact lengthwise strip, or some combination thereof, would reduce the con-centrated openness of the cover at the specifically targeted mid-region of the concave, and thus may undesirable, or at least less preferable to the single-hole example of the illustrated embodiment, in which the inclusion of intact crosswise and lengthwise strips of the plate is left for the more "open" plates 100B, 100C where the greater length-wise span of the hole layout may necessitate the inclusion of such intact strips between multiple holes to retain sufficient structural integrity of the plate over their larger perforated regions. Along the same line of reasoning, the second frontmost cover 100B (of second greatest openness among the set of covers) may have multiple rows of holes, like the two-rowed quad-hole cover 100C whose first and third holes 102D, 102F form one row, and second and fourth holes 102E, 102G form another row, with an intact lengthwise strip separating the rows, yet this may be undesirable or less preferable to the illustrated embodiment, were multi-rowed hole layouts are limited to the third and fourth frontmost spots, where the inclusion of the intact lengthwise strip 114D may be necessary for structural integrity.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A cover device for installation on a concave grate of a combine harvester to alter operating characteristics of said concave grate, said cover device comprising:
    an elongated cover plate having a length dimension arranged to lie in a circumferential directionality of the concave grate when installed thereon, and a lesser width dimension arranged to lie in an axial direction-ality of the concave grate when installed thereon;
    a set of holes in said elongated cover plate that penetrate therethrough in a thickness dimension the cover plate that is of orthogonal relationship to said length and width dimensions and is lesser than both said length and width dimensions;
    wherein:
        each hole of said set is fully surrounded on all sides thereof by intact solid areas of said cover plate;
        a length of each hole in a direction matching said length dimension of the cover plate exceeds a width of each hole in a direction matching said width dimension of the cover plate;
        on any widthwise reference axis that lies parallel to the width dimension of the cover plate and spans across any one or more holes of said set, said any one or more holes of the set spanned by said widthwise reference axis occupy at least 30% of the width dimension.

2. The device of claim 1 wherein said any one or more holes of the set spanned by said widthwise reference axis occupy more than 50% the width dimension.

3. The device of claim 1 wherein said any one or more holes of the set spanned by said widthwise reference axis occupy more than 60% the width dimension.

4. The device of claim 1 wherein said any one or more holes of the set spanned by said widthwise reference axis occupy more than 70% the width dimension.

5. The device of claim 1 wherein said any one or more holes of the set spanned by said widthwise reference axis occupy no more than 80% the width dimension.

6. The device of claim 1 wherein said any one or more holes of the set spanned by said widthwise reference axis occupy no more than 75% the width dimension.

7. The device of claim 1 wherein said any one or more holes of the set spanned by said widthwise reference axis consists of one hole spanned by said widthwise reference axis.

8. The device of claim 7 wherein the set of holes com-prises two holes, each spanned by a different respective widthwise reference axis on which a respective one of said two holes occupies at least 30% of the width dimension of the cover plate.

9. The device of claim 8 wherein the set of holes consists solely of said two holes.

10. The device of claim 8 wherein said two holes each have a respective inner end and a respective outer end, of which the outer end resides nearer to a respective end of the cover plate at which the length dimension thereof termi-nates, and wherein a distance measured from the inner end of one of said two holes to the inner end of the other of said two holes is less than a distance measured from the outer end of each hole to respective end of the cover plate.

11. The device of claim 1 wherein said any one or more holes of the set spanned by said widthwise reference axis comprises first and second holes spanned by said widthwise reference axis.

12. The device of claim 11 wherein the set of holes comprises said first and second holes spanned by said widthwise reference axis, and third and fourth holes spanned by another widthwise reference axis on which third and fourth holes occupy at least 30% of the width dimension of the cover plate.

13. The device of claim 12 wherein the set of holes consists solely of said first, second, third and fourth holes.

14. The device of claim 12 wherein said first and second holes span a shared lengthwise region of the cover plate and said third and fourth holes span another shared lengthwise region of the cover plate that is of non-matching offset relation to the shared lengthwise region of the first and second holes.

15. The device of claim 12 wherein each of said first, second, third and fourth holes each have a respective inner end and a respective outer end, of which the outer ends of the first and second holes resides nearer to a first end of the cover plate than the inner ends of the first and second holes, and the outer ends of the third and fourth holes reside nearer to an opposing second end of the cover plate than the inner ends of the third and fourth holes, and a distance between the inner ends of the first and third holes and a distance between the inner ends of the second and fourth holes are each less than a distance from the outer ends of the first and second holes to the first end of the cover plate and also less than a distance from the outer ends of the third and fourth holes to the second end of the cover plate.

16. The device of claim 1 wherein said any one or more holes of the set spanned by said widthwise reference axis comprises first and second holes spanned by said widthwise reference axis, and said first and second holes span a shared lengthwise region of the cover plate.

17. The device of claim 1 wherein the length of each hole spans at least 20% of the length dimension of the cover plate.

18. The device of claim 1 wherein the length of each hole spans at least 25% of the length dimension of the cover plate.

19. The device of claim 1 wherein the length of each hole spans at least 30% of the length dimension of the cover plate.

20. The device of claim 1 wherein the length of each hole spans no more than 50% of the length dimension of the cover plate.

\* \* \* \* \*